United States Patent
Ihnfeldt et al.

(10) Patent No.: US 12,163,701 B2
(45) Date of Patent: Dec. 10, 2024

(54) MAGNETIC REFRIGERATION SYSTEMS FOR CRYOGENIC APPLICATIONS

(71) Applicants: General Engineering & Research, L.L.C., San Diego, CA (US); The Regents of the University of California, Oakland, CA (US)

(72) Inventors: Robin Ihnfeldt, San Diego, CA (US); Renkun Chen, San Diego, CA (US); Sungho Jin, San Diego, CA (US); Tianshi Feng, La Jolla, CA (US); Sarath Adapa, Oakland, CA (US)

(73) Assignees: General Engineering & Research LLC, San Diego, CA (US); The Regents of the University of California, Oakland, CA (US)

( * ) Notice: Subject to any disclaimer, the term of this patent is extended or adjusted under 35 U.S.C. 154(b) by 198 days.

(21) Appl. No.: 17/630,443

(22) PCT Filed: Jul. 28, 2020

(86) PCT No.: PCT/US2020/043899
§ 371 (c)(1),
(2) Date: Jan. 26, 2022

(87) PCT Pub. No.: WO2021/021824
PCT Pub. Date: Feb. 4, 2021

(65) Prior Publication Data
US 2022/0252308 A1    Aug. 11, 2022

Related U.S. Application Data

(60) Provisional application No. 62/880,546, filed on Jul. 30, 2019.

(51) Int. Cl.
F25B 21/00     (2006.01)

(52) U.S. Cl.
CPC ........ *F25B 21/00* (2013.01); *F25B 2321/002* (2013.01)

(58) Field of Classification Search
CPC ........ F25B 2321/0022; F25B 2321/002; F25B 21/00; H01F 1/015; F25J 1/0221; F25J 1/001; F25J 1/0007; F25J 2270/912
See application file for complete search history.

(56) References Cited

U.S. PATENT DOCUMENTS

| | | | |
|---|---|---|---|
| 5,249,424 A | 10/1993 | DeGregoria et al. | |
| 2011/0192834 A1* | 8/2011 | Muller | H10N 15/20 |
| | | | 219/618 |

(Continued)

FOREIGN PATENT DOCUMENTS

| | | |
|---|---|---|
| DE | 10 2015 113448 | 2/2017 |
| JP | 2005-089740 A | 4/2005 |

OTHER PUBLICATIONS

Search Report and Written Opinion received in International Application No. PCT/US2020/043899 dated Oct. 27, 2020.

(Continued)

*Primary Examiner* — Ana M Vazquez
(74) *Attorney, Agent, or Firm* — Knobbe, Martens, Olson & Bear, LLP

(57) ABSTRACT

Systems and methods disclosed herein relate to a cryogenic refrigeration system which may use a compression based cryocooler or liquid nitrogen pre-cool to cool a medium to ~80K, and may in conjunction with a magnetic refrigeration system operating in the sub-80K temperature regime to provide cooling to a medium to temperatures below 80K. In some embodiments, the disclosed system may be useful for cooling on the order of about 3 kg/day to about 300 kg/day of hydrogen gas to liquid form, with higher efficiency than a standard vapor compression based system. This higher (Continued)

efficiency may make the system a more attractive candidate for use in cryogenic cooling applications.

19 Claims, 10 Drawing Sheets

(56) References Cited

U.S. PATENT DOCUMENTS

| | | | |
|---|---|---|---|
| 2014/0099245 A1* | 4/2014 | Hamad | B01D 53/62 |
| | | | 96/242 |
| 2016/0076797 A1* | 3/2016 | Boeder | F25B 21/00 |
| | | | 62/3.1 |
| 2017/0138646 A1 | 5/2017 | Ihnfeldt et al. | |
| 2019/0137171 A1 | 5/2019 | Barclay et al. | |

OTHER PUBLICATIONS

Park et al., "Development of the active magnetic regenerative refrigerator operating between 77 K and 20 K with the conduction cooled high temperature superconducting magnet," Cryogenics 88 (2017) 106-115; 10 pages.

A. Rowe, Thermodynamics of active magnetic regenerators: Part I, Cryogenics, vol. 52, Issues 2-3, 2012, pp. 111-118.

H.J.M ter Brake and G.F.M. Wiegerinck, Cryogenics, 42, 705-718, 2002.

Holladay, "MagnetoCaloric Hydrogen Liquefaction," Pacific Northwest National Laboratory, 2016, Project ID. PD131.

* cited by examiner

US 12,163,701 B2

MAGNETIC REFRIGERATION SYSTEMS FOR CRYOGENIC APPLICATIONS

CROSS-REFERENCE TO RELATED APPLICATIONS

This application claims priority to International Application No. PCT/US2020/043899 filed on Jul. 28, 2020 entitled "MAGNETIC REFRIGERATION SYSTEMS FOR CRYOGENIC APPLICATIONS," which claims priority to U.S. Provisional Patent Application No. 62/880,546 filed on Jul. 30, 2019 entitled "MAGNETIC REFRIGERATION SYSTEMS FOR GAS LIQUEFACTION APPLICATIONS", the contents of each of which are incorporated herein by reference in their entirety.

GOVERNMENT LICENSE RIGHTS

This invention was made with government support under DE-SC0015932 awarded by the Department of Energy. The Government has certain rights in this invention.

FIELD

Embodiments of the systems and methods disclosed herein generally relate to a cryogenic refrigeration system which utilizes the magnetocaloric effect to perform a portion of the refrigeration at or below cryogenic temperatures (~80K or below). In some embodiments, the disclosed system is useful for cooling on the order of about 3 kg/day to about 300 kg/day of hydrogen gas to liquid form, with higher efficiency than a system which utilizes only the vapor compression refrigeration cycle.

BACKGROUND

Magnetic refrigeration has long been touted as a promising high efficiency technology to replace vapor compression (VCC) systems. However, there are several major issues that need to be solved to move this technology forward. The technology utilizes the magnetocaloric effect (MCE), which is the temperature variation of a special magnetic material when exposed to a changing magnetic field. Magnetic refrigerators generally have two main components for operation:
1) MCE materials that function in the desired temperature range
2) Magnetic field force generated by superconducting, electro-, or permanent magnets.

One of the issues inhibiting magnetic refrigeration progress is the lack of commercially available low cost MCE materials that will actually function, for a long period of time, in a magnetic refrigeration environment such as the active magnetic regenerator (AMR) which is in development by several entities. Another major issue inhibiting magnetic refrigeration from moving forward is that very little work has been done designing and engineering actual systems which utilize the MCE mechanism. Pacific Northwestern National Laboratory (PNNL), has made phenomenal progress building a hydrogen liquefaction magnetic refrigeration system to demonstrate large scale (30 tonne/day) liquefaction from room temperature down to 20K, which requires MCE materials for the entire 20K-300K temperature range and uses a superconducting magnet. Their results indicate potential for these systems to hit the 50% reduction in energy (6 kW-hr/kg) and capital equipment cost ($50M) for a large scale liquefaction plant (30 metric tonnes/day) compared to current technology. However, there are still some major engineering challenges that need to be addressed to move from their 25 kg/day prototype, to the 30 ton/day production plant (i.e. scaling the superconducting magnetic field), and this would require a massive industrial investment in a technology that has, thus far, only been proven at 1/1000th the scale, and has yet to reach the 20K temperature needed to liquefy H2 (last known report their system went down to ~120K).

SUMMARY

Systems and methods disclosed herein relate to a cryogenic refrigeration system which may use a compression based cryocooler or liquid nitrogen pre-cool to cool a medium to ~80K, and may in conjunction with a magnetic refrigeration system operating in the sub-80K temperature regime to provide cooling to a medium to temperatures below 80K. In some embodiments, the disclosed system is useful for cooling on the order of about 3 kg/day to about 300 kg/day of hydrogen gas to liquid form, with higher efficiency than a standard vapor compression based system. This higher efficiency may make the system a more attractive candidate for use in cryogenic cooling applications.

Some embodiments provide a cryogenic refrigeration system for cooling a medium to temperatures below 80K comprising a dual stage system, a closed-loop heat transfer fluid flow system, and at least one heat exchanger. In some embodiments, the first stage of the dual stage system acts to cool from room temperature down to 80K, and the second stage of the dual stage system acts to cool from 80K down to the desired temperature below 80K, and wherein the first stage comprises either a vapor compression refrigeration system, or a liquid nitrogen tank, or a combination thereof, and wherein the second stage of the dual stage system comprises a magnetocaloric refrigeration system. In some embodiments, the heat transfer fluid circulates through a closed-loop heat transfer fluid flow system which comprises cooling the heat transfer fluid using the first stage, then flowing the heat transfer fluid through the magnetocaloric refrigeration system where a portion of the heat transfer fluid is cooled and then flowed through the at least one heat exchanger to provide cooling to the medium, and then the heat transfer fluid returns to a compressor which transfers the heat transfer fluid into a pressurized tank so that it can be re-circulated in the system. In some embodiments, the magnetocaloric refrigeration system comprises at least one magnetocaloric bed and an oscillating permanent magnetic field operating at a pre-defined frequency, wherein the frequency of oscillation includes magnetizing the magnetocaloric material in the magnetocaloric bed at a predefined magnetic field ramp-up speed, maintaining the magnetic field on the magnetocaloric bed for a specified holding time, demagnetizing the magnetocaloric bed at a predefined ramp-down speed, and maintaining zero magnetic field on the magnetocaloric bed for a specified removed time. In some embodiments, the application of the permanent magnetic field to the magnetocaloric bed causes the magnetocaloric material to heat up, and the removal of the permanent magnetic field from the magnetocaloric bed causes the magnetocaloric material to cool down. In some embodiments, the flow of the heat transfer fluid into and out of the at least one magnetocaloric bed is coupled with the oscillation of the permanent magnetic field so that a portion of the heat transfer fluid is cooled to the desired temperature below 80K and flowed through the at least one heat exchanger. In some embodiments, the at least one heat exchanger acts to transfer heat from the medium to the heat transfer fluid such that the medium is cooled to the desired sub-80K cryogenic temperature.

In some embodiments of the cryogenic refrigeration system the medium to be cooled to cryogenic temperatures is Hydrogen or Helium. In some embodiments, the medium to be cooled is a chamber. In some embodiments, the medium to be cooled is a well insulated chamber in which other items or mediums can be placed to be refrigerated to cryogenic temperatures by the cryogenic refrigeration system.

In some embodiments of the cryogenic refrigeration system the heat transfer fluid is Helium gas or Hydrogen gas. In some embodiments, the heat transfer fluid is compressed Helium gas.

In some embodiments of the cryogenic refrigeration system the at least one permanent magnet field comprises a NdFeB-based permanent magnet. In some embodiments of the cryogenic refrigeration system the NdFeB-based permanent magnet is a Halbach magnet.

In some embodiments of the cryogenic refrigeration system the frequency of the oscillating permanent magnet field is between about 0.1 Hz to about 10 Hz.

In some embodiments of the cryogenic refrigeration system the at least one magnetocaloric bed comprises a magnetocaloric material with a composition of $(A_xB_{1-x})Si_{1-y-z}(Cr_yMn_z)$ wherein A and B are selected from the group consisting of Ce, Nd, or Gd, wherein x is in the range of about 0 to about 1.0, wherein y is in the range of about 0.05 to about 0.3, wherein z is in the range of about 0 to about 0.3, and wherein $0.05 \leq y+z \leq 0.3$.

In some embodiments of the cryogenic refrigeration system the at least one magnetocaloric bed comprises a magnetocaloric material with a composition of $(A_xB_{1-x})Si_{0.8}Cr_{0.2}$ wherein A and B are selected from the group consisting of Ce, Nd, or Gd, wherein x is in the range of about 0 to about 1.0.

In some embodiments of the cryogenic refrigeration system the permanent magnetic field is oscillated on and off the magnetocaloric material using a linear motion.

In some embodiments of the cryogenic refrigeration system the permanent magnetic field is oscillated on and off the magnetocaloric material using a rotational motion.

Another embodiment, provides a cryogenic refrigeration system for cooling and liquefying on the order of about 3 kg to about 300 kg per day of hydrogen comprising a liquid nitrogen first stage, a magnetocaloric refrigeration system as a second stage, a closed-loop heat transfer fluid flow system, and at least four heat exchangers, wherein the liquid nitrogen pre-cool comprises a liquid nitrogen filled tank wherein the hydrogen gas to be cooled is flowed through the liquid nitrogen so that it is cooled to 77K prior to entering the first heat exchanger, and wherein the at least four heat exchangers act to cool the hydrogen gas by transferring heat from the hydrogen gas to the heat transfer fluid, such that upon exit from the last heat exchanger the hydrogen is cooled to below its boiling point so that it exits the last heat exchanger in liquid form. In some embodiments the heat transfer fluid is helium gas which circulates through a closed-loop system that includes flowing the helium gas through the liquid nitrogen pre-cool, the magnetocaloric beds of the magnetocaloric refrigeration system, the at least four heat exchangers, and a compressor which transfers the helium gas into a pressurized tank so that it can be re-circulated in the system, and wherein various valves and flow paths may be used throughout the cryogenic refrigeration system to control the flow rate and portion of the helium gas through the heat exchangers and magnetocaloric beds. In some embodiments the magnetocaloric beds comprise magnetocaloric materials, wherein the magnetocaloric materials comprise $(A_xB_{1-x})Si_{1-y-z}(Cr_yMn_z)$ wherein A and B are selected from the group consisting of Ce, Nd, or Gd, wherein x is in the range of about 0 to about 1.0, wherein y is in the range of about 0.05 to about 0.3, and wherein z is in the range of about 0 to about 0.3, and wherein $0.05 \leq y+z \leq 0.3$. In some embodiments an oscillating permanent magnetic field operating at a pre-defined frequency of between about 0.1 Hz and about 10 Hz, wherein the frequency of oscillation includes magnetizing the magnetocaloric material at a predefined magnetic field ramp-up speed, maintaining the magnetic field on the magnetocaloric bed for a specified holding time, demagnetizing the magnetocaloric material at a predefined ramp-down speed, and maintaining zero magnetic field on the magnetocaloric bed for a specified removed time, and wherein the application of the permanent magnetic field to the magnetocaloric bed causes the magnetocaloric material to heat up, and the removal of the permanent magnetic field from the magnetocaloric bed causes the magnetocaloric material to cool down. In some embodiments, the flow of the helium heat transfer fluid into and out of the at least one magnetocaloric bed is coupled with the oscillation of the permanent magnetic field so that portions of the helium heat transfer fluid are cooled below 80K and flowed through the at least four heat exchangers to provide enough cooling to the hydrogen so that it is liquefied exiting the final heat exchanger.

In some embodiments of the cryogenic refrigeration system, a catalyst to aid in ortho to para conversion of the hydrogen is incorporated into the system.

For purposes of summarizing aspects, and the advantages achieved over the related art, certain objects and advantages, are described in this disclosure. Of course, it is to be understood that not necessarily all such objects or advantages may be achieved in accordance with any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the embodiments which follow.

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

commercially available vapor compression cycle (VCC) cryocooler and c) replacing the low temperature stage with a theoretical magnetic refrigeration system (n is system efficiency, assumes electricity cost of $0.20/kW-hr). Also shown are a typical industrial liquid cryogen storage tank and a standard industrial cryocooler unit attached to high tech processing equipment.

Figure 4A:
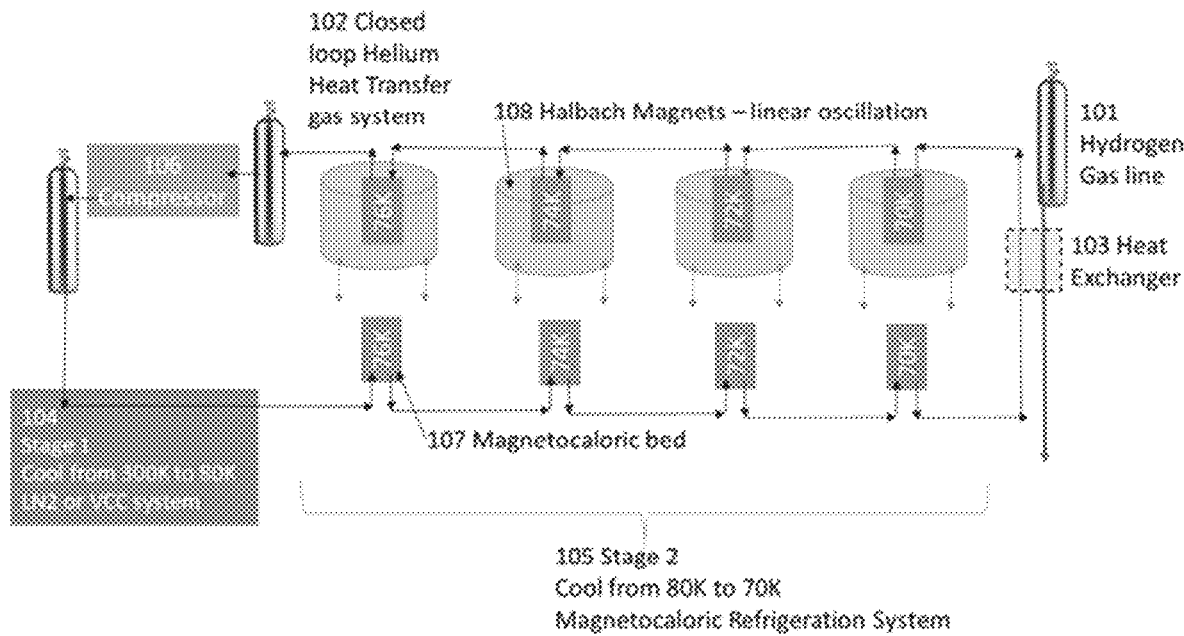
Figure 4B:
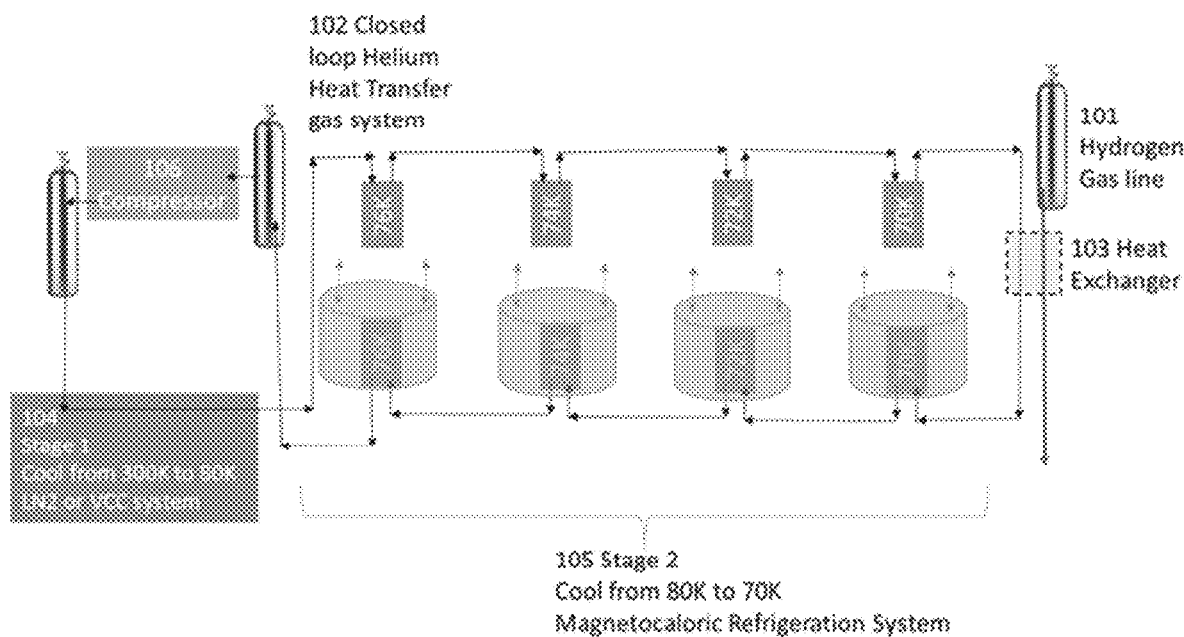

FIGS. 4A and 4B illustrate example aspects of an example embodiment.

Figure 5A:
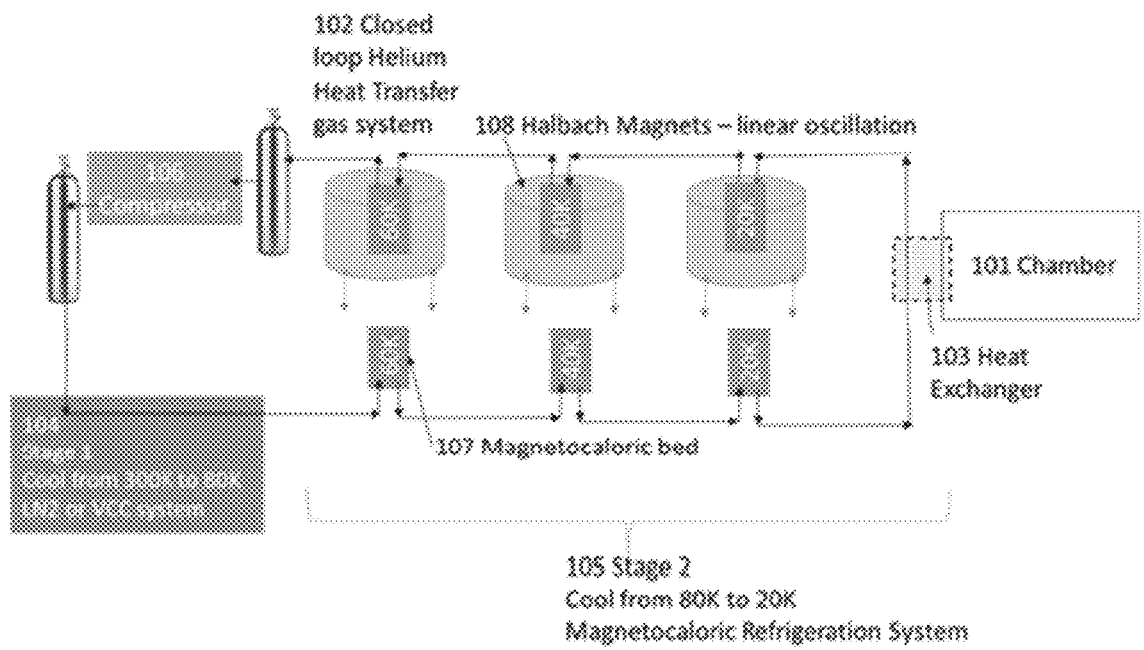
Figure 5B:
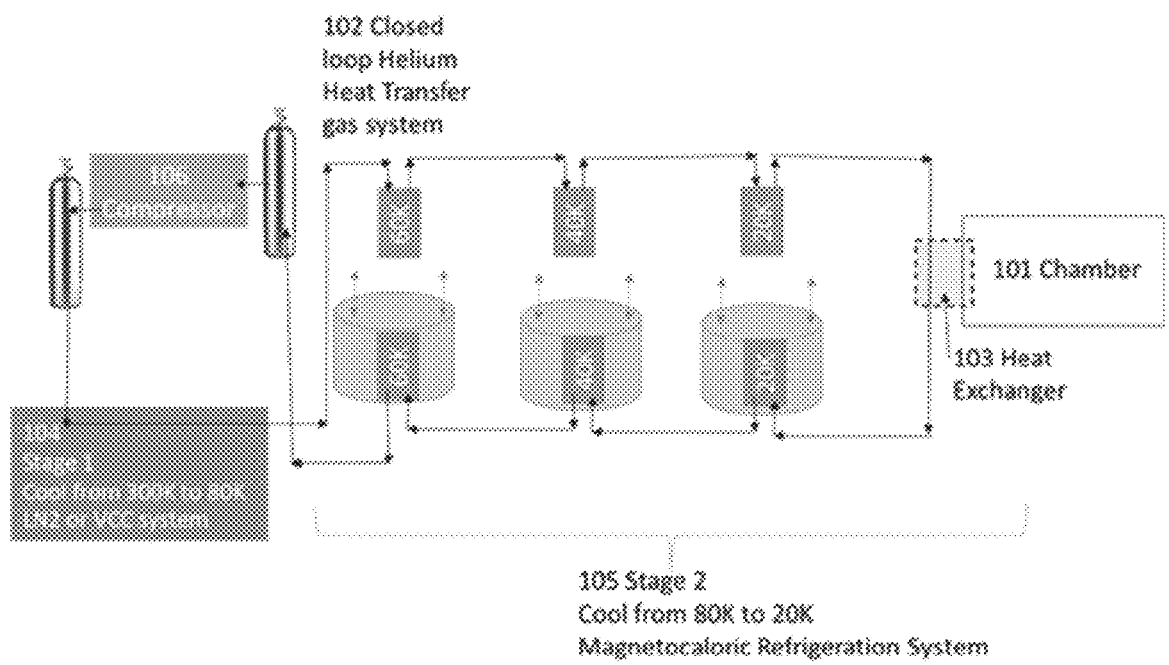

FIGS. 5A and 5B illustrate example aspects of another example embodiment.

Figure 6:
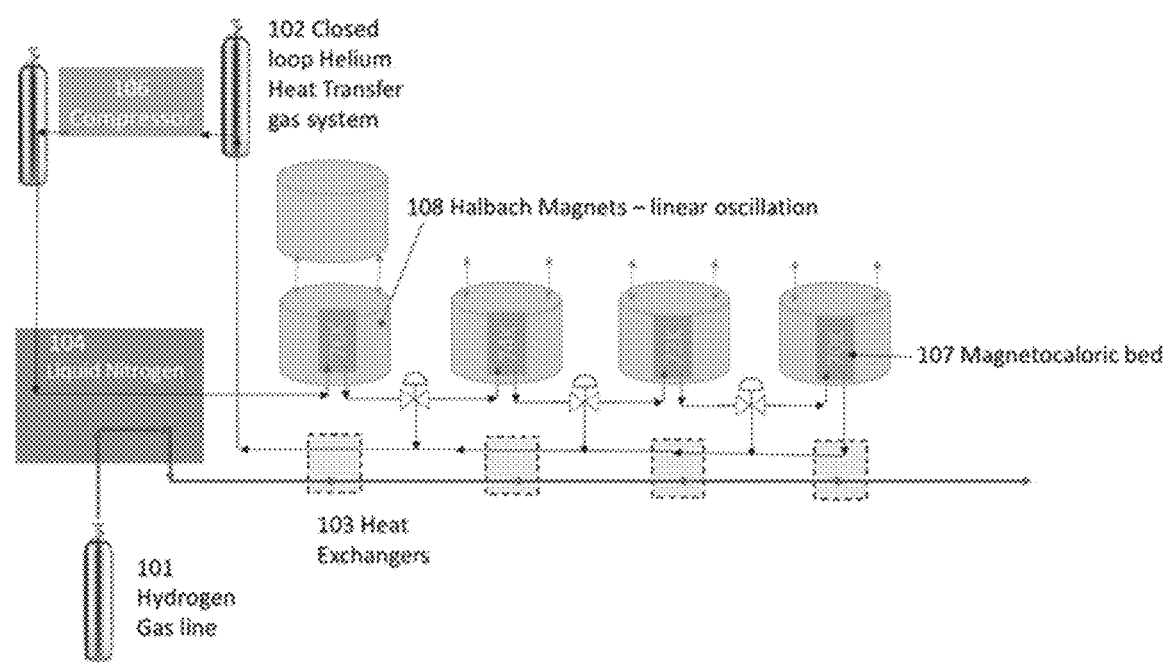
Figure 7:
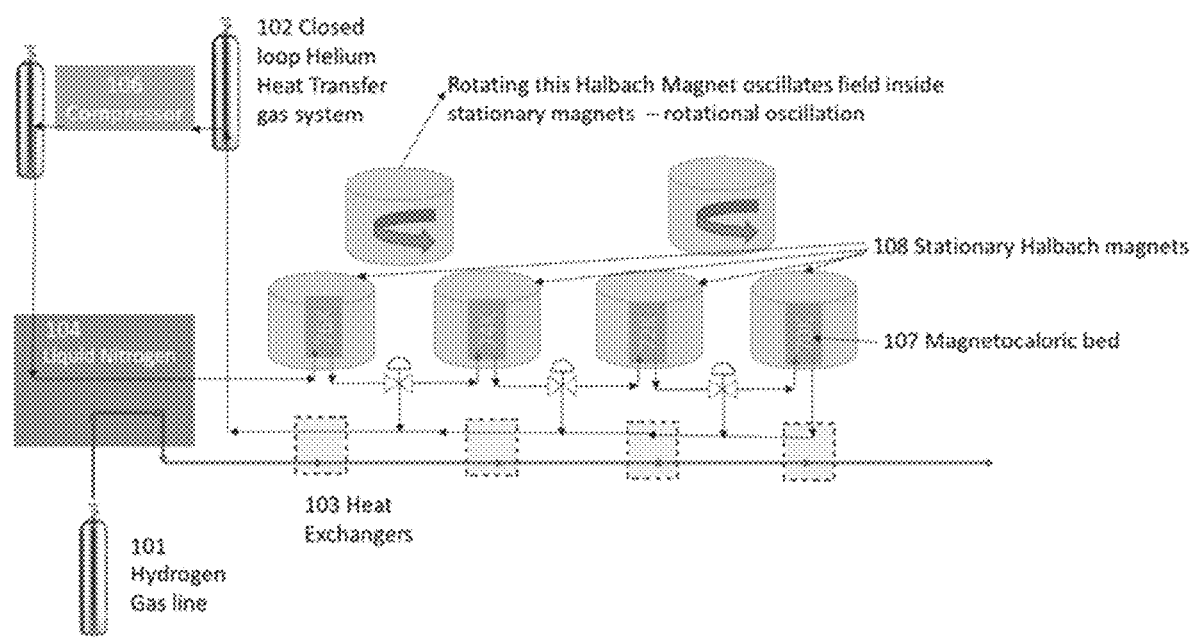
Figure 8:
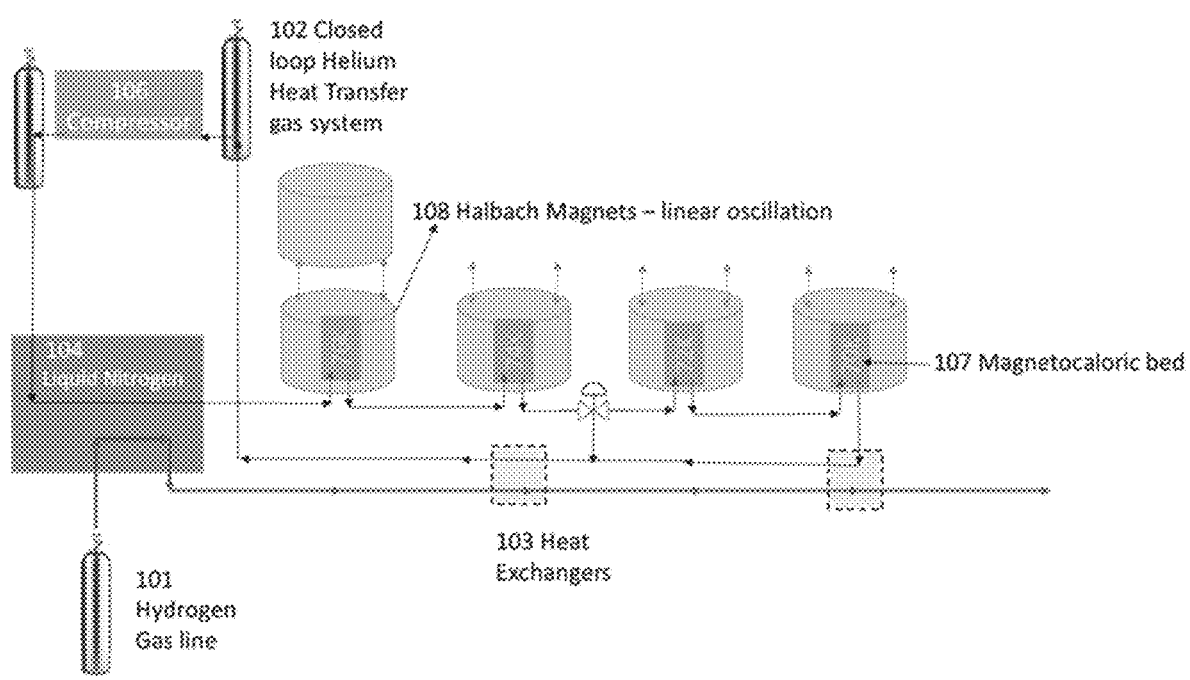
Figure 9:
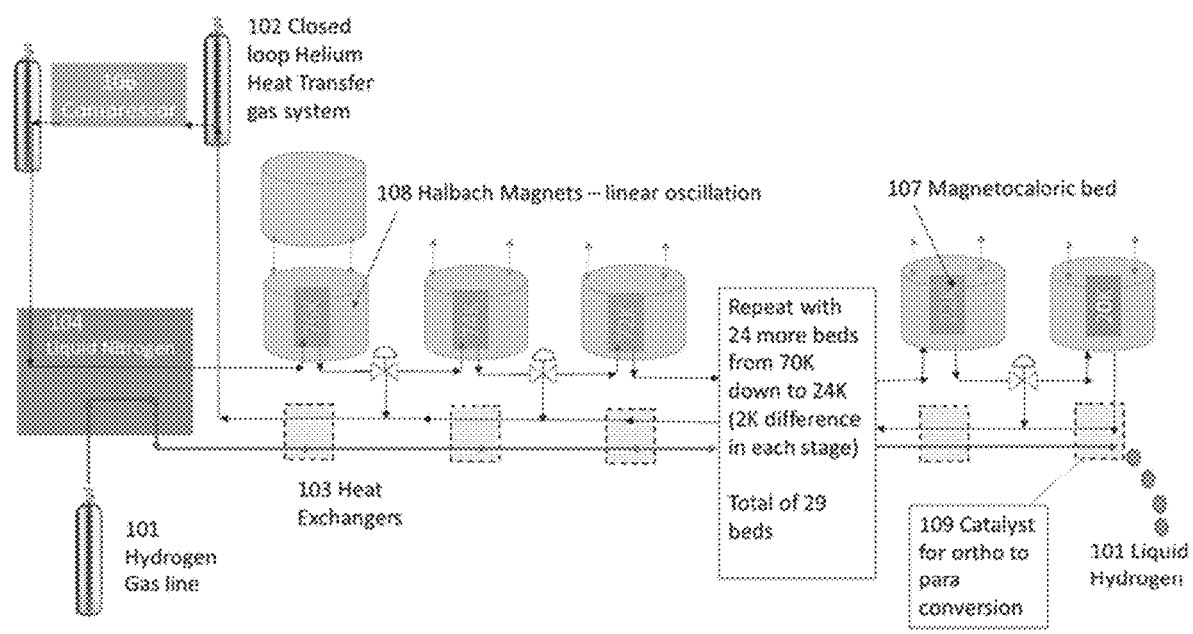
Figure 10:
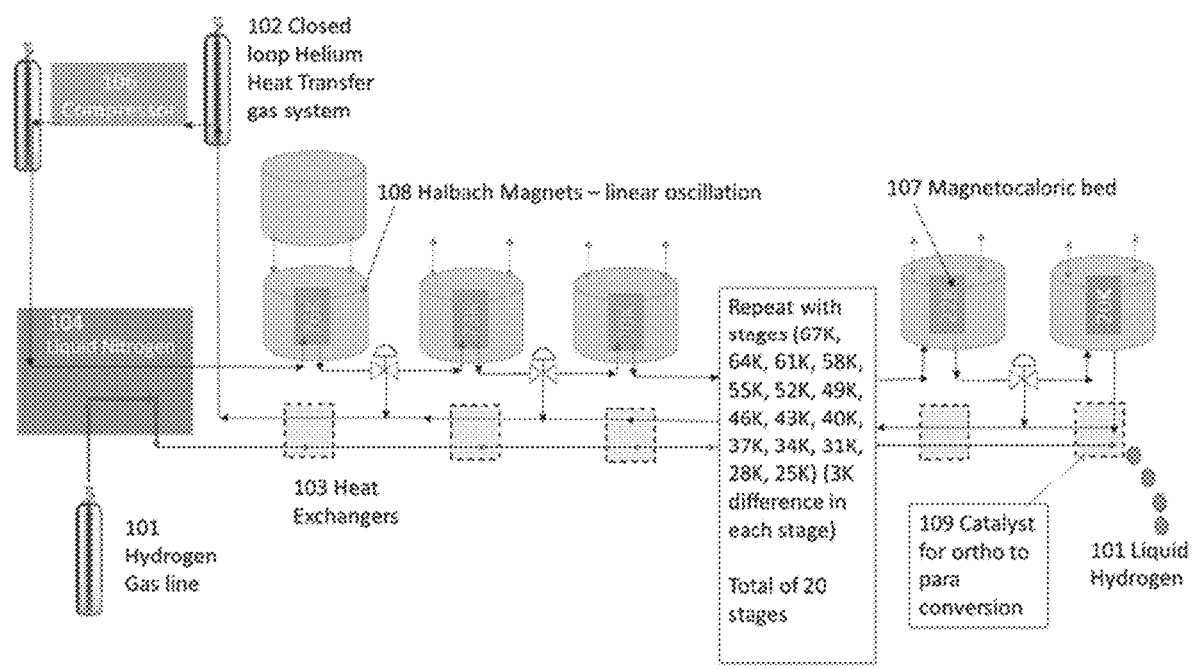

FIG. 6 illustrates another example embodiment.
FIG. 7 illustrates another example embodiment.
FIG. 8 illustrates another example embodiment.
FIG. 9 illustrates another example embodiment.
FIG. 10 illustrates another example embodiment.

DETAILED DESCRIPTION

The magnetocaloric effect (MCE) is a phenomenon in which the temperature change of a suitable material is caused by exposing the material to a changing magnetic field. The magnetocaloric effect can be quantified with the equation below:

$$\Delta T_{ad} = -\int_{H_0}^{H_1} \left(\frac{T}{C(T,H)}\right)_H \left(\frac{\partial M(T,H)}{\partial T}\right)_H dH$$

where T is the temperature, H is the applied magnetic field, C is the heat capacity of the working magnet (refrigerant) and M is the magnetization of the refrigerant. The temperature change in the material is caused by a change in the entropy of the material.

As used herein, the term "magnetocaloric effect" includes any phenomenon in which the temperature change of a material is caused by exposing the material to a changing magnetic field.

The magnetocaloric effect exhibited by most magnetocaloric materials is as follows: the temperature of the magnetocaloric material increases when the magnetic field is moved near or in contact with the magnetocaloric material, and wherein the temperature of the magnetocaloric material decreases when the magnetic field is moved away from the magnetocaloric material. Materials which undergo a magnetocaloric effect with application and removal of a magnetic field include, but are not limited to, Gadolinium based alloys. In some embodiments, the magnetocaloric material exhibits a magnetocaloric effect, wherein the temperature of the magnetocaloric material increases when the magnetic field is moved near or in contact with the magnetocaloric material, and wherein the temperature of the magnetocaloric material decreases when the magnetic field is moved away from the magnetocaloric material.

The magnetic refrigeration technology has been around for decades, however, an at-scale commercially viable magnetic refrigeration system (system with improved efficiency and/or cost over compression based systems) has yet be demonstrated for ANY application other than sub 4K cooling (which is currently available in commercialized products). The use of this technology looks promising for large scale gas liquefaction applications, however a large (~$50M+) capital equipment investment along with several years construction time would be needed to demonstrate this technology—which is an enormous risk for any for-profit entity to undergo. Successful demonstration of a commercially viable small scale magnetic refrigeration cryocooler system would require significantly less time and money to realize, and would help to legitimize this technology and lower the risk for large scale applications.

Further, a small scale high efficiency cryogenic refrigeration system would be useful for a variety of applications that could accelerate the path to a large scale hydrogen economy, also referred to as H2@Scale by the U.S. Department of Energy. This would include reducing liquid hydrogen (LH2) boil-off losses at fueling stations and enabling "Renewable" Power to Gas to LH2.

Disclosed herein is a theoretical model of an embodiment of the system to evaluate the feasibility of cooling 300 kg/day hydrogen from 77K (liquid nitrogen boiling point) to its liquefaction point (20.3K at 1 atm.), using only permanent magnets (max field: 1 Tesla), liquid nitrogen (LN) as the heat sink (hence the 77K hot side temperature), and helium gas as the heat transfer medium fluid. Based on these operation conditions, the model may be used to determine important system performance metrics, such as COP, total mass of the MCE material for each stage, total magnetic field volume, amount of LN needed, and the Helium gas flow rate. Using the model, effects of different designs may be determined, and designs identified which provide high COP and low MCE materials and magnet mass requirements.

Figure 1A:
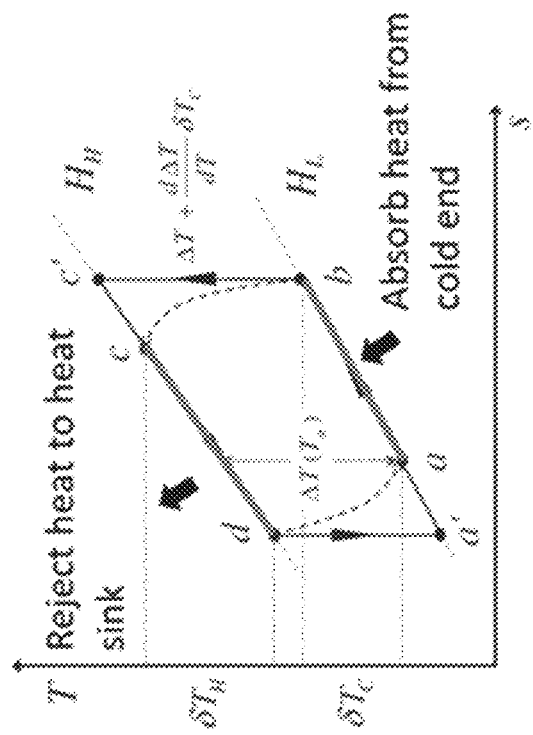
FIG. 1a illustrates an example MCE refrigeration thermodynamics cycle along regenerator.

FIG. 1(a) shows the T-s diagram of the MCE refrigeration thermodynamic cycle (adopted from Andrew Rowe, *Thermodynamics of active magnetic regenerators*: Part I, Cryogenics, Volume 52, Issues 2-3, 2012, Pages 111-118). The solid line represents the temperature of the MCE material, and the dashed line represents the fluid medium (Helium) temperature. From a-b, the system absorbs heat from the object to be cooled (e.g., H2); from b-c', the magnetic field is applied and the MCE material temperature changes from b to c'; then, the fluid temperature increases from c to b, and rejects the heat to a heat sink and temperature goes from c to d; finally, the magnetic field is removed, and material temperature reduces from d to a' to complete the system cycle. At the cold end location (point a), the cycle absorbs heat from the cold end and rejects heat to the heat sink (either the previous stage or the LN).

In the current model, we assume adiabatic conditions (no heat loss to the environment during magnetization/de-magnetization). We further assume that when we change the magnetic field, which is a very fast process relative to the entire cycle, there is no fluid flow in the material during the magnetic field change. Similarly, during heat transfer between the medium fluid and MCE material, it may be assumed the magnetic field is constant (either zero or at a constant set field strength, e.g., 1 Tesla).

Based on the second law of thermodynamics, work must be provided to a refrigeration system to pump the heat from low to high temperature. The same principle applies for MCE, but here the work comes from magnetic work and the work to drive the fluid medium flowing in the system (pumping power).

Figure 1B:
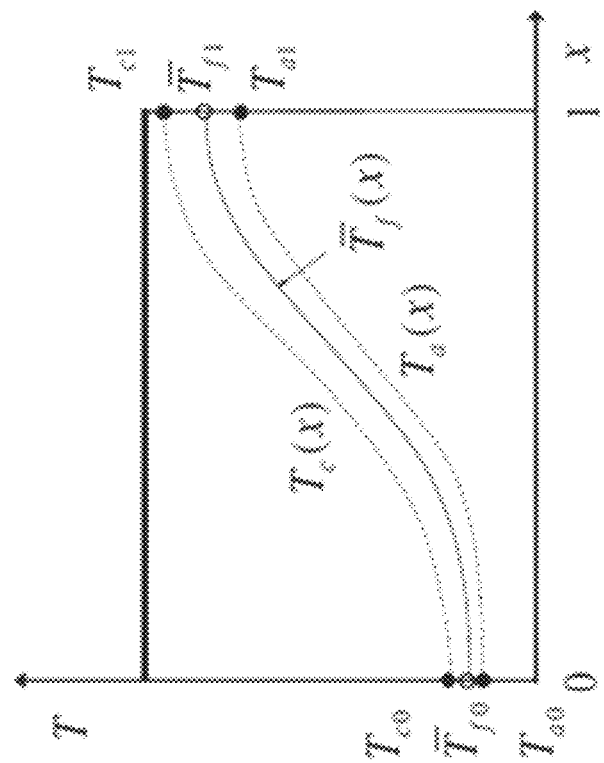
FIG. 1b illustrates an example temperature distribution along the fluid direction of the regenerator (adopted from A. Rowe, Thermodynamics of active magnetic regenerators: Part I, Cryogenics, Volume 52, Issues 2-3, 2012, Pages 111-118).

Each point in FIG. 1(a) represents the temperatures of the MCE material and the fluid. There is certainly a temperature difference between the material and fluid. There is also a temperature gradient within the material or fluid, since the temperature spans between cold end and hot ends, as shown in FIG. 1(b). The solid line in FIG. 1(b) represents the average fluid temperature. In Andrew Rowe's work, they used thermodynamics (FIG. 1a) to determine the temperature distribution, cooling power, and other parameters. In our model, we assumed 1D heat transfer along the fluid flow direction as shown in FIG. 1b.

Figure 2:
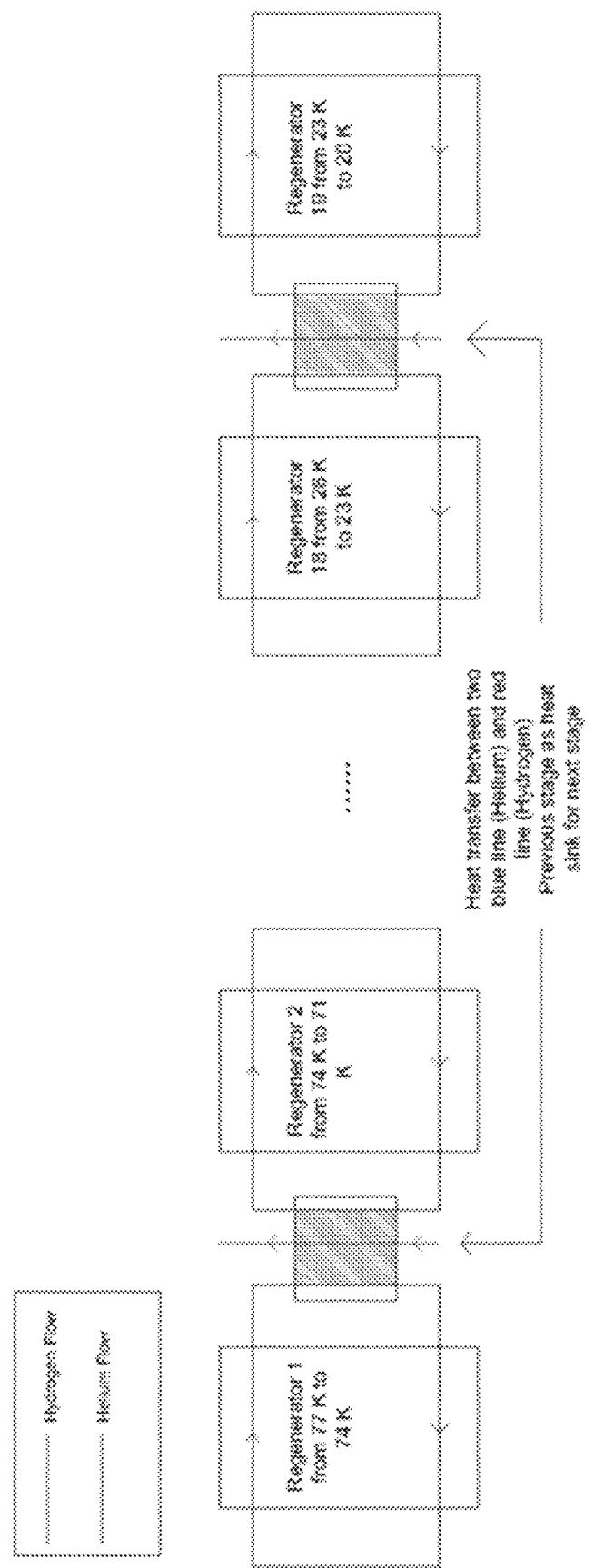
FIG. 2 system diagram of the modeled multi-bed MCE cycle. In this example, each bed cools down H2 by 3K, so 19 beds are needed to cool H2 from 77K to 20 K. The heat sink of a down stream bed (e.g., $19^{th}$) is cooled by the upstream bed (e.g., $18^{th}$). The heat sink of the first bed is liquid nitrogen (LN).

Since our system uses permanent magnets which only have the maximum field intensity of 1 Tesla, we need multiple stages to cool down hydrogen from 77K to 20K. FIG. 2 shows the model diagram of the proposed multi-bed MCE refrigeration system considered in our model. According to the properties of our MCE materials, we considered two different temperature spans of H2 cooling for each bed, 3K (19 beds total) and 4K (14 beds total). If we choose 3K temperature span at each bed, there would be 19 beds total. The $19^{th}$ bed will cool down H2 from 23K to 20K, and its heat sink will be cooled down by the $18^{th}$ bed, which also cools down the H2 from 26 K to 23K. Therefore, the cooling power of the $18^{th}$ bed will be higher than that of $19^{th}$ bed. This process continues until it reaches the first bed, where the heat sink (stage 1) is the LN (at 77 K).

In the model, we may assume very efficient heat transfer between Helium and the MCE material, which means we can use the same temperature to represent both. Using this assumption simplifies the governing equations significantly, and results should be fairly comparable to the experiments. The governing equations for our model are not provided here.

At the last bed (bed $19^{th}$ for 3K temperature span per bed and bed $14^{th}$ for 4K temperature span per bed), cooling power is only needed to absorb the heat from H2, hence we first determine MCE material mass and Helium mass flow rate needed for the last bed; then using the last bed results we can calculate the parameters needed for the previous bed, and this procedure is repeated one by one until reaching the first bed. Table 1 summarizes results from the last bed, using an example case with the temperature span of 3K at this bed and 10 Hz operation frequency. Based on these results, we can optimize the design of the last bed based on the most desirable design objective. For instance, if we want to get the maximum COP, which means minimum work (WW=$_M$+ $W_{pump}$), we can choose ṁ=0.018 kg/s and magnet field volume V=0.019 m³ (the bold row in table 1).

Table 2 below shows the model results for several different design cases. The Case 2 system with a temperature span of 3K and frequency of 10 Hz achieves 77% of Carnot COP, while also providing the smallest system (lowest cost due to less MCE materials and magnets) than the other example cases shown. These examples illustrate the significant effects that small changes in the system design, such as frequency and/or expected temperature span, has on the system size, cost, and performance.

Even so, based on this initial work, we believe a small scale H2 liquefaction system which achieves >50% of Carnot COP and which is also economically competitive with traditional VCC systems is feasible Further, COP's higher than 50% and costs significantly lower than VCC systems are certainly possible.

TABLE 1

Example modeling results for the last bed of a 300 kg/day H2 liquefaction MCE refrigeration system with 10 Hz frequency and 3 K temperature span on each bed.

| Temperature Span (K) | Material Mass (kg) | Flow Rate (kg/s) | Work (W) | COP | Magnetic Field Volume (mm³) |
|---|---|---|---|---|---|
| 3 | 1.784 | 0.019 | 67.172 | 1.82 | 27899 |
| 3 | 1.365 | 0.02 | 75.957 | 1.61 | 27899 |
| 3 | 1.138 | 0.021 | 85.868 | 1.42 | 27899 |
| 3 | 1.781 | 0.019 | 70.642 | 1.73 | 31386 |
| 3 | 1.927 | 0.019 | 63.637 | 1.91 | 24411 |
| 3 | 1.82 | 0.019 | 64.535 | 1.89 | 27899 |
| 3 | 1.785 | 0.019 | 67.781 | 1.8 | 31386 |
| 3 | 1.97 | 0.019 | 61.17 | 1.99 | 24411 |
| 3 | 1.843 | 0.018 | 56.389 | 2.01 | 20924 |
| 3 | 1.72 | 0.018 | 58.31 | 1.97 | 24411 |
| 3 | 1.47 | 0.018 | 62.015 | 1.83 | 27899 |

TABLE 2

Case 1-4 are model results of a magnetic refrigeration system with ~2 kW cooling power operating from 80K to 20K where effects of various system parameters were evaluated. VCC provides a comparison to existing compression based technology.

| Input Parameters | Case 1 | Case 2 | Case 3 | Case 4 | VCC |
|---|---|---|---|---|---|
| Cycling Frequency | 1 Hz | 10 Hz | 1 Hz | 10 Hz | — |
| Temperature Span at each stage | 3 K | 3 K | 4 K | 4 K | — |
| Results | | | | | |
| Number of beds | 19 | 19 | 14 | 14 | — |
| Total volume of Magnetic Field (m³) | 0.679 | 0.123 | 0.44 | 0.26 | — |
| Total Mass of MCE material (kg) | 4630 | 870 | 3029 | 1760 | — |
| Mass flow heat transfer fluid (kg/s) | 4.238 | 2.252 | 3.423 | 3.0 | — |
| Total Power Input [kW] | 13.7 | 7.8 | 11 | 8.8 | 63 kW |
| Cooling Power [kW] | 2.1 | 2.1 | 2.1 | 2.1 | 2.1 |
| COP of system | 0.15 | 0.27 | 0.19 | 0.24 | — |
| Fraction of Carnot COP | 43% | 77% | 54% | 69% | 10% |
| Cost for MCE materials and magnets* | ~$1.4M | ~$260K | ~$930K | ~$550K | — |
| Estimated power input and cost for VCC 80-300K Cryocooler with 25% efficiency | <200 kW ~$200,000 | | | | 716 kW |
| Total Cost of Full System 20-300K | ~$1.6M | ~$460K | ~$1.2M | ~$750K | $5M+ |

*assumes $75/kg for MCE materials (manufactured by GE&R) and magnet cost of $0.0016/mm³. These costs can be achieved with bulk purchasing of the raw materials.

From Table 2, Case 2 provided the highest efficiency of 77% and a power input requirement of only 7.8 kW, along with an estimated cost of ~$260K for the biggest cost driver for these systems, the magnets and MCE materials. As a comparison, a compression based system with a 10% efficiency operating in this same temperature regime (20-80K) will require an enormous 63 kW of power input for the first stage (10-80K) and 716 kW of power input for the second stage (80-300K) as calculated below:

$$VCC \text{ System } 1(20-80K) W_1 = \frac{Q_1}{n \times COP_{Carnot}} = \frac{2.1 \text{ kW}}{0.1 \times \frac{20}{(80-20)}} = 63 \text{ kW}$$

$$VCC \text{ System } 2(80-300K) W_2 = \frac{Q_2 + Q_1 + W_1}{n \times COP_{Carnot}} = \frac{2.1 \text{ kW} + 63 \text{ kW}}{0.25 \times \frac{80}{(300-80)}} = 716 \text{ kW}$$

with an estimated capital cost for a full system operating from 20-300K on the order of ~$5M+, according to H. J. M ter Brake and G. F. M. Wiegerinck, *Cryogenics*, 42, 705-718, 2002. For all cases studied in Table 1, the estimated cost of a full system operating from 20-300K which utilizes a magnetic refrigeration system for the 20-80K is below $2M, less than half the cost of a comparable VCC system—this is because the significant improvement in efficiency of the low temperature stage allows a smaller and cheaper higher temperature system to be utilized as the second stage.

Figure 3:
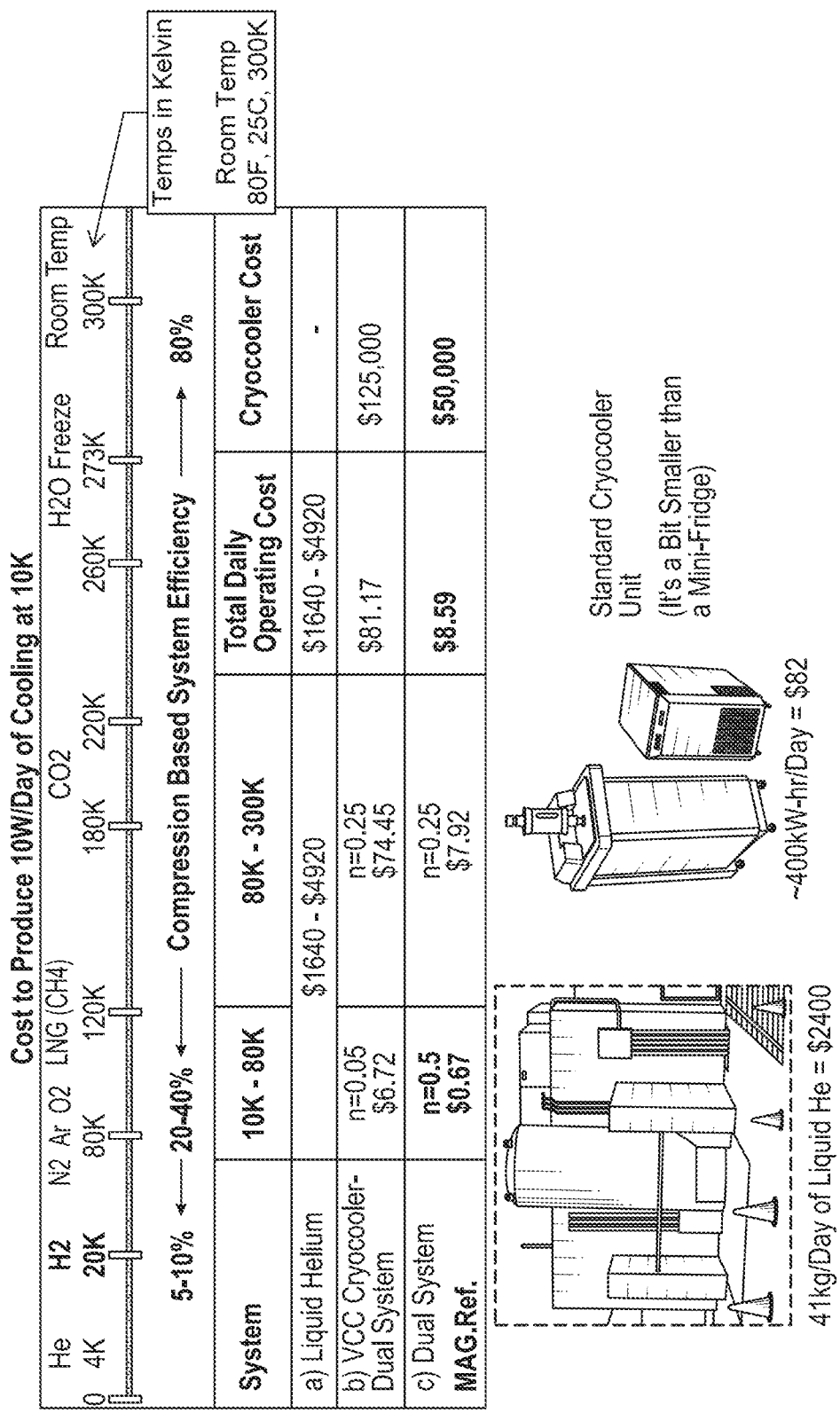
FIG. 3 shows the operational and capital costs to produce 10 W/day of cooling at 10K using a) liquid helium versus b)

The current options for manufactures to achieve the cryogenic temperatures needed in their processes are to either use a liquid cryogen (such as liquid helium) or to use a compression based cryocooler. FIG. 3 shows a typical cryogen dewar tank along with a standard industrial cyrocooler unit and compares costs of these options to achieve 10 W of cooling power at 10K, which is about average needs of typical electronics processing equipment.

Liquid helium is the only known cryogen that can be used to achieve sub-10K temperatures. Helium is typically obtained as a byproduct from natural gas extraction, but can also be pulled from other underground sources. Helium is lighter than air, and once it is released as a gas it leaves earth's atmosphere, making it a limited and depleting resource. Because of this, the price for helium has skyrocketed over the last few decades, and price increases continue to be expected as demand increases and supply dwindles. In 2018 a 100% price increase occurred, and another 40% increase occurred in early 2019. Global helium demand is currently $6B annually with roughly 40% of this demand originating from cryogenic uses—which means ~$2.5B annually is spent on liquid helium to achieve cryogenic temperatures. For these cryogenic applications, the helium is delivered in liquid form (refrigerated to 4K) and used in process equipment to cool components to cryogenic temperatures. Typically, once the helium boils off, it is released to the atmosphere and lost forever (or at least until we find a way to pull it out of space). Because of the skyrocketing cost of liquid helium, many manufacturers are turning to compression based cryocoolers to achieve the temperatures needed in their processes.

Cryocoolers are refrigeration systems that can provide cooling down to cryogenic temperatures, typically defined as below ~120K. For systems that operate down to 10K they have efficiencies, at best, of 5-10% of Carnot (Carnot is theoretical maximum). Currently these systems utilize the traditional vapor compression (VCC) mechanism found in nearly all refrigeration systems—which is why they are so terrible at cryogenic temperatures. Compression based refrigeration relies on compressing and expanding a gas (referred to as a refrigerant, for room temperature applications this is Freon, or R-134a, etc.). At cryogenic temperatures there are not many options for refrigerants. At 10K the only known material in the universe that exists as a gas is helium—which means this is the only option available as a refrigerant—and helium is not a good refrigerant! Thus significant improvement in efficiency of compression based systems at cryogenic temperatures is not possible.

As an example, FIG. 3 illustrates the operational and capital equipment costs for various options available to manufactures to provide 10 W per day of cooling at 10K. With the price of liquid helium varying from $40/kg to $120/kg (depending on delivery distance and quantity), the daily operating cost using liquid helium cryogen will run between about $1640-$4920 per day. The costs associated with implementing a compression based dual cryocooler to achieve the same 10 W of cooling at 10K are also provided in FIG. 3. The efficiency of the first system (from 300K to 80K) and the second system (from 80K to 10K) are assumed to be 25% and 5%, respectively. In the FIG. 3 example, electricity rates were assumed to be $0.20/kW-hr. The cryocooler provides significantly improved daily operational costs of $81/day but also requires a capital equipment investment of ~$125,000. It should be noted, the cryocooler systems will also require maintenance (typically every ~2 years) and have operating life-times on the order of 5-10 years (where units which last longer are much higher cost). Even so, factoring in maintenance and life-time, implementing a compression based cryocooler has become a more economical choice compared to liquid helium. However, because these cryocooler units consume so much energy the deployment of even a small number of them has the potential to become a significant strain on the electric grid.

FIG. 3 also illustrates the case where a high efficiency magnetic refrigeration system with 50% of Carnot efficiency is used as the first system to cool from 80-10K, and the second system uses existing technology to cool from 300-80K with 25% efficiency. By replacing the most inefficient portion of compression based refrigeration (that is the portion from 80-10K) with a more efficient magnetic refrigeration unit, the work input requirements of the second compression based system are significantly lower, which reduces both the electrical requirements and capital cost of the second system—this translates to a 90% reduction in electrical costs and a >60% reduction in capital equipment costs over the existing VCC technology. It should be noted, this example assumes conservatively that the cost of the magnetic refrigeration unit is the same as an equivalently sized compression based system, which is consistent with our modeling results.

Some embodiments disclosed herein provide a cryogenic refrigeration system for cooling a medium to temperatures below 80K comprising a dual stage system, a closed-loop heat transfer fluid flow system, and at least one heat exchanger. In some embodiments, the first stage of the dual stage system acts to cool from room temperature down to 80K, and the second stage of the dual stage system acts to cool from 80K down to the desired temperature below 80K, and wherein the first stage comprises either a vapor compression refrigeration system, or a liquid nitrogen tank, or a combination thereof, and wherein the second stage of the dual stage system comprises a magnetocaloric refrigeration system. In some embodiments, the heat transfer fluid circulates through a closed-loop heat transfer fluid flow system which comprises cooling the heat transfer fluid using the first stage, then flowing the heat transfer fluid through the magnetocaloric refrigeration system where a portion of the heat transfer fluid is cooled and then flowed through the at least one heat exchanger to provide cooling to the medium, and then the heat transfer fluid returns to a compressor which transfers the heat transfer fluid into a pressurized tank so that it can be re-circulated in the system. In some embodiments, the magnetocaloric refrigeration system comprises at least one magnetocaloric bed and an oscillating permanent magnetic field operating at a pre-defined frequency, wherein the frequency of oscillation includes magnetizing the magnetocaloric material in the magnetocaloric bed at a predefined magnetic field ramp-up speed, maintaining the magnetic field on the magnetocaloric bed for a specified holding time, demagnetizing the magnetocaloric bed at a predefined ramp-down speed, and maintaining zero magnetic field on the magnetocaloric bed for a specified removed time. In some embodiments, the application of the permanent magnetic field to the magnetocaloric bed causes the magnetocaloric material to heat up, and the removal of the permanent magnetic field from the magnetocaloric bed causes the magnetocaloric material to cool down. In some embodiments, the flow of the heat transfer fluid into and out of the at least one magnetocaloric bed is coupled with the oscillation of the permanent magnetic field so that a portion of the heat transfer fluid is cooled to the desired temperature below 80K and flowed through the at least one heat exchanger. In some embodiments, the at least one heat exchanger acts to transfer heat from the medium to the heat transfer fluid such that the medium is cooled to the desired sub-80K cryogenic temperature.

In some embodiments of the cryogenic refrigeration system the medium to be cooled to cryogenic temperatures is Hydrogen or Helium. In some embodiments, the medium is an insulated chamber. In some embodiments, the medium is an insulated vacuum chamber.

In some embodiments of the cryogenic refrigeration system the heat transfer fluid is Helium gas or Hydrogen gas.

In some embodiments of the cryogenic refrigeration system the at least one permanent magnet field comprises a NdFeB-based permanent magnet. In some embodiments of the cryogenic refrigeration system the NdFeB-based permanent magnet is a Halbach magnet.

In some embodiments of the cryogenic refrigeration system the frequency of the oscillating permanent magnet field is between about 0.1 Hz to about 10 Hz.

In some embodiments of the cryogenic refrigeration system the at least one magnetocaloric bed comprises a magnetocaloric material with a composition of $(A_xB_{1-x})Si_{1-y-z}(Cr_yMn_z)$ wherein A and B are selected from the group consisting of Ce, Nd, or Gd, wherein x is in the range of about 0 to about 1.0, wherein y is in the range of about 0.05 to about 0.3, wherein z is in the range of about 0 to about 0.3, and wherein $0.05 \leq y+z \leq 0.3$.

In some embodiments of the cryogenic refrigeration system the at least one magnetocaloric bed comprises a magnetocaloric material with a composition of $(A_xB_{1-x})Si_{0.8}Cr_{0.2}$ wherein A and B are selected from the group consisting of Ce, Nd, or Gd, wherein x is in the range of about 0 to about 1.0.

In some embodiments of the cryogenic refrigeration system the permanent magnetic field is oscillated on and off the magnetocaloric material using a linear motion.

In some embodiments of the cryogenic refrigeration system the permanent magnetic field is oscillated on and off the magnetocaloric material using a rotational motion.

Another embodiment, provides a cryogenic refrigeration system for cooling and liquefying on the order of about 3 kg to about 300 kg per day of hydrogen comprising a liquid nitrogen first stage, a magnetocaloric refrigeration system as a second stage, a closed-loop heat transfer fluid flow system, and at least four heat exchangers, wherein the liquid nitrogen pre-cool comprises a liquid nitrogen filled tank wherein the hydrogen gas to be cooled is flowed through the liquid nitrogen so that it is cooled to 77K prior to entering the first heat exchanger, and wherein the at least four heat exchangers act to cool the hydrogen gas by transferring heat from the hydrogen gas to the heat transfer fluid, such that upon exit from the last heat exchanger the hydrogen is cooled to below its boiling point so that it exits the last heat exchanger in liquid form. In some embodiments the heat transfer fluid is helium gas which circulates through a closed-loop system that includes flowing the helium gas through the liquid nitrogen pre-cool, the magnetocaloric beds of the magnetocaloric refrigeration system, the at least four heat exchangers, and a compressor which transfers the helium gas into a pressurized tank so that it can be re-circulated in the system, and wherein various valves and flow paths may be used throughout the cryogenic refrigeration system to control the flow rate and portion of the helium gas through the heat exchangers and magnetocaloric beds. In some embodiments the magnetocaloric beds comprise magnetocaloric materials, wherein the magnetocaloric materials comprise $(A_xB_{1-x})Si_{1-y-z}(Cr_yMn_z)$ wherein A and B are selected from the group consisting of Ce, Nd, or Gd, wherein x is in the range of about 0 to about 1.0, wherein y is in the range of about 0.05 to about 0.3, and wherein z is in the range of about 0 to about 0.3, and wherein $0.05 \leq y+z \leq 0.3$. In some embodiments an oscillating permanent magnetic field operating at a pre-defined frequency of between about 0.1 Hz and about 10 Hz, wherein the frequency of oscillation includes magnetizing the magnetocaloric material at a predefined magnetic field ramp-up speed, maintaining the magnetic field on the magnetocaloric bed for a specified holding time, demagnetizing the magnetocaloric material at a predefined ramp-down speed, and maintaining zero magnetic field on the magnetocaloric bed for a specified removed time, and wherein the application of the permanent magnetic field to the magnetocaloric bed causes the magnetocaloric material to heat up, and the removal of the permanent magnetic field from the magnetocaloric bed causes the magnetocaloric material to cool down. In some embodiments, the flow of the helium heat transfer fluid into and out of the at least one magnetocaloric bed is coupled with the oscillation of the permanent magnetic field so that portions of the helium heat transfer fluid are cooled below 80K and flowed through the at least four heat exchangers to provide enough cooling to the hydrogen so that it is liquefied exiting the final heat exchanger.

In some embodiments of the cryogenic refrigeration system, a catalyst to aid in ortho to para conversion of the hydrogen is incorporated into the system.

For purposes of summarizing aspects, and the advantages achieved over the related art, certain objects and advantages, are described in this disclosure. Of course, it is to be understood that not necessarily all such objects or advantages may be achieved in accordance with any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed example embodiments which follow.

EXAMPLES

The embodiments will be explained with respect to preferred embodiments which are not intended to limit the present invention. Further, in the present disclosure where conditions and/or structures are not specified, the skilled artisan in the art can readily provide such conditions and/or structures, in light of the teachings herein, as a matter of routine experimentation.

The object of this current invention is to provide a cryogenic refrigeration system useful for cryogenic cooling and/or liquefaction applications.

Example 1

FIG. 4 shows an example embodiment, for a cryogenic refrigeration system for cooling a medium 101 down to 70K comprising a dual stage system, a closed-loop heat transfer fluid flow system 102, and at least one heat exchanger 103. In some embodiments, the first stage 104 of the dual stage system acts to cool from room temperature down to 80K, and the second stage 105 of the dual stage system acts to cool from 80K down to 70K, and wherein the first stage comprises either a vapor compression refrigeration system, or a liquid nitrogen tank, or a combination thereof, and wherein the second stage of the dual stage system comprises a magnetocaloric refrigeration system. In this embodiment, the heat transfer fluid circulates through a closed-loop heat transfer fluid flow system which comprises cooling the heat transfer fluid using the first stage, then flowing the heat transfer fluid through the cold side of the magnetocaloric refrigeration system where all of the heat transfer fluid is cooled and then flowed through the at least one heat exchanger to provide cooling to the medium, and then the heat transfer fluid flows through the hot side of the magnetocaloric refrigeration system and returns to a compressor 106 which transfers the heat transfer fluid into a pressurized tank so that it can be re-circulated in the system. In this embodiment, the magnetocaloric refrigeration system comprises four magnetocaloric beds 107 and a linear oscillating permanent magnetic field 108 supplied by Halbach magnets operating at a frequency between about 0.1 Hz to about 10 Hz. In this embodiment, the flow of the heat transfer fluid into and out of the magnetocaloric beds is coupled with the oscillation of the permanent magnetic field so that the flow direction of the heat transfer fluid switches depending on the position of the magnet so that all of the heat transfer fluid is cooled to 70K after flowing through the cold side of the magnetocaloric system and then flowed through the at least one heat exchanger to cool the medium.

Example 2

FIG. 5 shows an example embodiment, for a cryogenic refrigeration system for cooling a medium 101 down to 20K comprising a dual stage system, a closed-loop heat transfer fluid flow system 102, and at least one heat exchanger 103. In some embodiments, the first stage 104 of the dual stage system acts to cool from room temperature down to 80K, and the second stage 105 of the dual stage system acts to cool from 80K down to 20K, and wherein the first stage comprises either a vapor compression refrigeration system, or a liquid nitrogen tank, or a combination thereof, and wherein the second stage of the dual stage system comprises a magnetocaloric refrigeration system. In this embodiment, the heat transfer fluid circulates through a closed-loop heat transfer fluid flow system which comprises cooling the heat transfer fluid using the first stage, then flowing the heat transfer fluid through the cold side of the magnetocaloric refrigeration system where all of the heat transfer fluid is cooled and then flowed through the at least one heat exchanger to provide cooling to the medium, and then the heat transfer fluid flows through the hot side of the magnetocaloric refrigeration system and returns to a compressor 106 which transfers the heat transfer fluid into a pressurized tank so that it can be re-circulated in the system. In this embodiment, the magnetocaloric refrigeration system comprises three magnetocaloric beds 107 and a linear oscillating permanent magnetic field 108 supplied by Halbach magnets operating at a frequency between about 0.1 Hz to about 10 Hz. In this embodiment, the flow of the heat transfer fluid into and out of the magnetocaloric beds is coupled with the oscillation of the permanent magnetic field so that the flow direction of the heat transfer fluid switches depending on the position of the magnet so that all of the heat transfer fluid is cooled to 20K after flowing through the cold side of the magnetocaloric system and then flowed through the at least one heat exchanger to cool the medium.

Example 3

FIG. 6 shows an example embodiment, for a cryogenic refrigeration system for cooling hydrogen gas 101 down to 20K, comprising a liquid nitrogen pre-cool 104, a closed-loop helium heat transfer fluid flow system 102, four heat exchangers 103, and four magnetocaloric beds 107. In this embodiment the liquid nitrogen pre-cool comprises a liquid nitrogen filled tank wherein the hydrogen gas to be cooled flows through the liquid nitrogen so that it is cooled to 77K prior to entering the first heat exchanger. In this embodiment, the heat exchangers act to further cool the hydrogen gas by transferring heat from the hydrogen gas to the helium heat transfer fluid. In this embodiment, the helium heat transfer fluid circulates through a closed-loop heat transfer fluid flow system which comprises flowing the helium heat transfer fluid through the liquid nitrogen pre-cool, the four magnetocaloric beds, the four heat exchangers, and a compressor 106 which transfers the helium heat transfer fluid into a pressurized tank so that it can be re-circulated in the system. In this embodiment, various valves are used throughout the magnetic refrigeration system to control the flow rate and portion of the helium gas through the heat exchangers and magnetocaloric beds. In this embodiment, the four magnetocaloric beds comprise magnetocaloric materials and linearly oscillating permanent magnetic field supplied by Halbach magnets operating at a pre-defined frequency of about 0.1 Hz to about 10 Hz. In this embodiment, the flow of the heat transfer fluid into and out of the four magnetocaloric beds is coupled with the oscillation of the permanent magnetic field so that a portion of the helium heat transfer fluid can be cooled and flowed through the four heat exchangers to provide cooling to the hydrogen gas.

Example 4

FIG. 7 shows an example embodiment, for a cryogenic refrigeration system for cooling hydrogen gas 101 down to 70K, comprising a liquid nitrogen pre-cool 104, a closed-loop helium heat transfer fluid flow system 102, four heat exchangers 103, and four magnetocaloric beds 107. In this embodiment the liquid nitrogen pre-cool comprises a liquid nitrogen filled tank wherein the hydrogen gas to be cooled flows through the liquid nitrogen so that it is cooled to 77K prior to entering the first heat exchanger. In this embodiment, the heat exchangers act to further cool the hydrogen gas by transferring heat from the hydrogen gas to the helium heat transfer fluid. In this embodiment, the helium heat transfer fluid circulates through a closed-loop heat transfer fluid flow system which comprises flowing the helium heat transfer fluid through the liquid nitrogen pre-cool, the four magnetocaloric beds, the four heat exchangers, and a compressor 106 which transfers the helium heat transfer fluid into a pressurized tank so that it can be re-circulated in the system. In this embodiment, various valves are used throughout the magnetic refrigeration system to control the flow rate and portion of the helium gas through the heat exchangers and magnetocaloric beds. In this embodiment, the four magnetocaloric beds comprise magnetocaloric materials and rotationally oscillating permanent magnetic field supplied by Halbach magnets operating at a pre-defined frequency of about 0.1 Hz to about 10 Hz. In this embodiment, the flow of the heat transfer fluid into and out of the four magnetocaloric beds is coupled with the oscillation of the permanent magnetic field so that a portion of the helium heat transfer fluid can be cooled and flowed through the four heat exchangers to provide cooling to the hydrogen gas.

Example 5

FIG. 8 shows an example embodiment, for a cryogenic refrigeration system for cooling hydrogen gas 101 down to 70K, comprising a liquid nitrogen pre-cool 104, a closed-loop helium heat transfer fluid flow system 102, two heat exchangers 103, and four magnetocaloric beds. In this embodiment the liquid nitrogen pre-cool comprises a liquid nitrogen filled tank wherein the hydrogen gas to be cooled flows through the liquid nitrogen so that it is cooled to 77K prior to entering the first heat exchanger. In this embodiment, the heat exchangers act to further cool the hydrogen gas by transferring heat from the hydrogen gas to the helium heat transfer fluid. In this embodiment, the helium heat transfer fluid circulates through a closed-loop heat transfer fluid flow system which comprises flowing the helium heat transfer fluid through the liquid nitrogen pre-cool, the four magnetocaloric beds, the two heat exchangers, and a compressor which transfers the helium heat transfer fluid into a pressurized tank so that it can be re-circulated in the system. In this embodiment, various valves are used throughout the magnetic refrigeration system to control the flow rate and portion of the helium gas through the heat exchangers and magnetocaloric beds. In this embodiment, the four magnetocaloric beds comprise magnetocaloric materials and linearly oscillating permanent magnetic field supplied by Halbach magnets 108 operating at a pre-defined frequency of about 1 Hz to about 10 Hz. In this embodiment, the flow of the heat transfer fluid into and out of the four magnetocaloric beds is coupled with the oscillation of the permanent magnetic field so that a portion of the helium heat transfer fluid can be cooled and flowed through the two heat exchangers to provide cooling to the hydrogen gas.

Example 6

FIG. 9 shows an example embodiment, for a cryogenic refrigeration system for cooling and liquefying hydrogen gas 101 down to 20K, comprising a liquid nitrogen pre-cool 104, a closed-loop helium heat transfer fluid flow system 102, 29 heat exchangers 103, and 29 magnetocaloric beds 107. In this embodiment the liquid nitrogen pre-cool comprises a liquid nitrogen filled tank wherein the hydrogen gas to be cooled flows through the liquid nitrogen so that it is cooled to 77K prior to entering the first heat exchanger. In this embodiment, the heat exchangers act to further cool the hydrogen gas by transferring heat from the hydrogen gas to the helium heat transfer fluid. In this embodiment, the helium heat transfer fluid circulates through a closed-loop heat transfer fluid flow system which comprises flowing the helium heat transfer fluid through the liquid nitrogen pre-cool, the 29 magnetocaloric beds, the 29 heat exchangers, and a compressor 106 which transfers the helium heat transfer fluid into a pressurized tank so that it can be re-circulated in the system. In this embodiment, various valves are used throughout the magnetic refrigeration system to control the flow rate and portion of the helium gas through the heat exchangers and magnetocaloric beds. In this embodiment, the 29 magnetocaloric beds comprise magnetocaloric materials and linearly oscillating permanent magnetic field supplied by Halbach magnets 108 operating at a pre-defined frequency of about 0.1 Hz to about 10 Hz. In this embodiment, the flow of the heat transfer fluid into and out of the 29 magnetocaloric beds is coupled with the oscillation of the permanent magnetic field so that a portion of the helium heat transfer fluid can be cooled and flowed through the 29 heat exchangers to provide cooling to the hydrogen gas. In this embodiment, a catalyst 109 is incorporated into the last heat exchanger to aid in ortho to para conversion of the hydrogen.

Example 7

FIG. 10 shows an example embodiment, for a cryogenic refrigeration system for cooling and liquefying hydrogen gas 101 down to 20K, comprising a liquid nitrogen pre-cool 104, a closed-loop helium heat transfer fluid flow system 102, 20 heat exchangers 103, and 20 magnetocaloric beds 107. In this embodiment the liquid nitrogen pre-cool comprises a liquid nitrogen filled tank wherein the hydrogen gas to be cooled flows through the liquid nitrogen so that it is cooled to 77K prior to entering the first heat exchanger. In this embodiment, the heat exchangers act to further cool the hydrogen gas by transferring heat from the hydrogen gas to the helium heat transfer fluid. In this embodiment, the helium heat transfer fluid circulates through a closed-loop heat transfer fluid flow system which comprises flowing the helium heat transfer fluid through the liquid nitrogen pre-cool, the 20 magnetocaloric beds, the 20 heat exchangers, and a compressor 106 which transfers the helium heat transfer fluid into a pressurized tank so that it can be re-circulated in the system. In this embodiment, various valves are used throughout the magnetic refrigeration system to control the flow rate and portion of the helium gas through the heat exchangers and magnetocaloric beds. In this embodiment, the 20 magnetocaloric beds comprise magnetocaloric materials and linearly oscillating permanent magnetic field supplied by Halbach magnets 108 operating at a pre-defined frequency of about 0.1 Hz to about 10 Hz. In this embodiment, the flow of the heat transfer fluid into and out of the 20 magnetocaloric beds is coupled with the oscillation of the permanent magnetic field so that a portion of the helium heat transfer fluid can be cooled and flowed through the 20 heat exchangers to provide cooling to the hydrogen gas. In this embodiment, a catalyst 109 is incorporated into the last heat exchanger to aid in ortho to para conversion of the hydrogen.

For purposes of summarizing aspects, and the advantages achieved over the related art, certain objects and advantages are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein. It will be understood by those of skill in the art that numerous and various modifications can be made without departing from the spirit of the systems and methods disclosed herein. Therefore, it should be clearly understood that the forms of the systems and methods disclosed herein are illustrative only and are not intended to limit the scope of the present invention.

Terminology

Conditional language used herein, such as, among others, "can," "could," "might," "may," "e.g.," and the like, unless specifically stated otherwise, or otherwise understood within the context as used, is generally intended to convey that certain, certain features, elements and/or steps are optional. Thus, such conditional language is not generally intended to imply that features, elements and/or steps are in any way required or that one or more implementations necessarily include logic for deciding, with or without other input or prompting, whether these features, elements and/or steps are included or are to be always performed. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Any methods disclosed herein need not be performed in the order recited. The methods disclosed herein include certain actions taken by a practitioner; however, they can also include any third-party instruction of those actions, either expressly or by implication.

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain implementations disclosed herein is indicated by the appended claims rather than by the foregoing description. All changes which come within the meaning and range of equivalency of the claims are to be embraced within their scope.

What is claimed is:

1. A cryogenic refrigeration system for cooling a medium to temperatures below 80K comprising a dual stage system, a closed-loop heat transfer fluid flow system, and at least one heat exchanger, wherein:
a first stage of the dual stage system acts to cool from room temperature down to 80K, and a second stage of the dual stage system acts to cool from 80K down to a desired temperature below 80K, and wherein the first stage comprises either a vapor compression refrigeration system, or a liquid nitrogen tank, or a combination thereof; and wherein the second stage of the dual stage system comprises a magnetocaloric refrigeration system; and wherein
a heat transfer fluid circulates through the closed-loop heat transfer fluid flow system, wherein the closed-loop heat transfer fluid flow system is configured to cool the heat transfer fluid using the first stage, then flowing the heat transfer fluid through the magnetocaloric refrigeration system where a portion of the heat transfer fluid is cooled and then flowed through the at least one heat exchanger to provide cooling to the medium, and then return the heat transfer fluid to a compressor which is configured to transfer the heat transfer fluid into a pressurized tank so that is can be re-circulated in the closed-loop heat transfer fluid flow system; and wherein
the magnetocaloric refrigeration system comprises at least one magnetocaloric bed and an oscillating permanent magnetic field operating at a pre-defined frequency, wherein a frequency of oscillation includes magnetizing a magnetocaloric material in the at least one magnetocaloric bed at a predefined magnetic field ramp-up speed, maintaining the magnetic field on the at least one magnetocaloric bed for a specified holding time, demagnetizing the at least one magnetocaloric bed at a predefined ramp-down speed, and maintaining zero magnetic field on the at least one magnetocaloric bed for a specified removed time; and wherein
application of the permanent magnetic field to the at least one magnetocaloric bed is configured to cause the magnetocaloric material to heat up, and removal of the permanent magnetic field from the at least one magnetocaloric bed is configured to cause the magnetocaloric material to cool down; and wherein
the flow of the heat transfer fluid into and out of the at least one magnetocaloric bed is coupled with the oscillation of the permanent magnetic field so that a portion of the heat transfer fluid is configured to be cooled to the desired temperature below 80K and flowed through the at least one heat exchanger, and wherein;

the at least one heat exchanger is configured to transfer heat from the medium to the heat transfer fluid such that the medium is cooled to the desired temperature below 80K; and wherein the at least one magnetocaloric bed comprises a magnetocaloric material with a composition of:

$(A_xB_{1-x})Si_{1-y-z}(Cr_yMn_z)$ wherein A and B are selected from the group consisting of Ce, Nd, or Gd,
wherein x is in a range of about 0 to about 1,
wherein y is in a range of about 0.05 to about 0.3,
wherein z is in a range of about 0 to about 0.3, and
wherein $0.05 \leq y+z \leq 0.3$.

2. The cryogenic refrigeration system of claim 1, wherein the medium to be cooled to cryogenic temperatures is Hydrogen or Helium.

3. The cryogenic refrigeration system of claim 1, wherein the heat transfer fluid is Helium gas or Hydrogen gas.

4. The cryogenic refrigeration system of claim 1, wherein the at least one permanent magnet field comprises a NdFeB-based permanent magnet.

5. The cryogenic refrigeration system of claim 4, wherein the NdFeB-based permanent magnet is a Halbach magnet.

6. The cryogenic refrigeration system of claim 1, wherein the frequency of the oscillating permanent magnet field is about 0.1 Hz to about 10 Hz.

7. The cryogenic refrigeration system of claim 1, wherein the at least one magnetocaloric bed comprises a magnetocaloric material with a composition of:

$(A_xB_{1-x})Si_{0.8}Cr_{0.2}$ wherein A and B are selected from the group consisting of Ce, Nd, or Gd, and
wherein x is in the range of about 0 to about 1.

8. The cryogenic refrigeration system of claim 1, wherein the permanent magnetic field is oscillated on and off the magnetocaloric material using a linear motion.

9. The cryogenic refrigeration system of claim 1, wherein the permanent magnetic field is oscillated on and off the magnetocaloric material using a rotational motion.

10. A cryogenic refrigeration system for cooling and liquefying on the order of about 3 kg to about 300 kg per day of hydrogen, the cryogenic refrigeration system comprising a liquid nitrogen first stage, a magnetocaloric refrigeration system as a second stage, a closed-loop heat transfer fluid flow system, and at least four heat exchangers, wherein;

a liquid nitrogen first stage comprises a liquid nitrogen filled tank wherein hydrogen gas is configured to be cooled to 77K through heat exchange with liquid nitrogen in the liquid nitrogen filled tank prior to entering a first heat exchanger of the at least four heat exchangers; and wherein the magnetocaloric refrigeration second stage comprises-magnetocaloric beds; and wherein the at least four heat exchangers are configured to cool the hydrogen gas after the liquid nitrogen first stage by transferring heat from the hydrogen gas to the heat transfer fluid, such that upon exit from a last heat exchanger of the at least four heat exchangers, the hydrogen gas is cooled to below its boiling point so that the hydrogen gas is at least partially condensed into liquid hydrogen; and wherein the closed-loop heat transfer fluid flow system is configured to circulate a heat transfer fluid comprising helium gas through the liquid nitrogen first stage, the magnetocaloric beds of the magnetocaloric refrigeration second stage, the at least four heat exchangers, and a compressor which transfers the heat transfer fluid into a pressurized tank so that it can be re-circulated in the closed-loop heat transfer system; and wherein the magnetocaloric beds of the magnetocaloric refrigeration second stage comprise magnetocaloric materials, wherein the magnetocaloric materials comprise:

$(A_xB_{1-x})Si_{1-y-z}(Cr_yMn_z)$ wherein A and B are selected from the group consisting of Ce, Nd, or Gd,
wherein x is in a range of about 0 to about 1,
wherein y is in arange of about 0.05 to about 0.3,
wherein z is in a range of about 0 to about 0.3, and
wherein $0.05 \leq y+z \leq 0.3$; and an oscillating permanent magnetic field configured to operating operate at a pre-defined frequency of between about 0.1Hz and about 10Hz, wherein the frequency of oscillation includes magnetizing the magnetocaloric material at a predefined magnetic field ramp-up speed, maintaining the magnetic field on the magnetocaloric beds for a specified holding time, demagnetizing the magnetocaloric material at a predefined ramp-down speed, and maintaining zero magnetic field on the magnetocaloric bed for a specified removed time; and wherein application of the permanent magnetic field to the magnetocaloric beds is configured to cause the magnetocaloric material to heat up, and removal of the permanent magnetic field from the magnetocaloric beds causes the magnetocaloric material to cool down; and wherein flow of the heat transfer fluid into and out of the magnetocaloric beds is coupled with the oscillation of the permanent magnetic field so that portions of the helium heat transfer fluid are configured to be cooled below 80K and flowed through the at least four heat exchangers to provide enough cooling at the last heat exchanger of the at least four heat exchangers to cool the hydrogen gas to below the boiling point of hydrogen so that the hydrogen gas is at least partially condensed into liquid hydrogen.

11. The cryogenic refrigeration system of 11, wherein a catalyst to aid in ortho to para conversion of the hydrogen gas is incorporated into the cryogenic refrigeration system.

12. A cryogenic refrigeration system for cooling a medium to temperatures below 80K comprising a dual stage system, a closed-loop heat transfer fluid flow system, and at least one heat exchanger, wherein:

a first stage of the dual stage system acts to cool from room temperature down to 80K, and a second stage of the dual stage system acts to cool from 80K down to a desired temperature below 80K, and wherein the first stage comprises either a vapor compression refrigeration system, or a liquid nitrogen tank, or a combination thereof; and wherein the second stage of the dual stage system comprises a magnetocaloric refrigeration system; and wherein a heat transfer fluid circulates through the closed-loop heat transfer fluid flow system, wherein the closed-loop heat transfer fluid flow system is configured to the heat transfer fluid using the first stage, then flow the heat transfer fluid through the magnetocaloric refrigeration system where a portion of the heat transfer fluid is cooled and then flowed through the at least one heat exchanger to provide cooling to the medium, and then return the heat transfer fluid to a compressor which is configured to transfer the heat transfer fluid into a pressurized tank so that is can be re-circulated in the closed-loop heat transfer fluid flow system; and wherein the magnetocaloric refrigeration system comprises at least one magnetocaloric bed and an oscillating permanent magnetic field operating at a pre-defined frequency, wherein a frequency of oscillation includes magnetizing a magnetocaloric material in the at least one magnetocaloric bed at a predefined magnetic field ramp-up speed, maintaining the magnetic field on the at least one magnetocaloric bed for a specified holding time, demagnetizing the at least one magnetocaloric bed at a predefined ramp-down speed, and maintaining zero magnetic field on the at least one magnetocaloric bed for a specified removed time; and wherein application of the permanent magnetic field to the at least one magnetocaloric bed is configured to cause the magnetocaloric material to heat up, and removal of the permanent magnetic field from the at least one magnetocaloric bed is configured to cause the magnetocaloric material to cool down; and wherein the flow of the heat transfer fluid into and out of the at least one magnetocaloric bed is coupled with the oscillation of the permanent magnetic field so that a portion of the heat transfer fluid is configured to be cooled to the desired temperature below 80K and flowed through the at least one heat exchanger; and wherein the at least one heat exchanger is configured to transfer heat from the medium to the heat transfer fluid such that the medium is cooled to the desired temperature below 80K; and wherein the at least one magnetocaloric bed comprises a magnetocaloric material with a composition of:

$$(A_xB_{1-x})Si_{0.8}Cr_{0.2}$$

wherein A and B are selected from the group consisting of Ce, Nd, or Gd, and wherein x is in a range of about 0 to about 1.

13. The cryogenic refrigeration system of claim 12, wherein the medium to be cooled to cryogenic temperatures is Hydrogen or Helium.

14. The cryogenic refrigeration system of claim 12, wherein the heat transfer fluid is Helium gas or Hydrogen gas.

15. The cryogenic refrigeration system of claim 12, wherein the at least one permanent magnet field comprises a NdFeB-based permanent magnet.

16. The cryogenic refrigeration system of claim 15, wherein the NdFeB-based permanent magnet is a Halbach magnet.

17. The cryogenic refrigeration system of claim 12, wherein the frequency of the oscillating permanent magnet field is about 0.1 Hz to about 10 Hz.

18. The cryogenic refrigeration system of claim 12, wherein the permanent magnetic field is oscillated on and off the magnetocaloric material using a linear motion.

19. The cryogenic refrigeration system of claim 12, wherein the permanent magnetic field is oscillated on and off the magnetocaloric material using a rotational motion.

* * * * *